Figure 1:
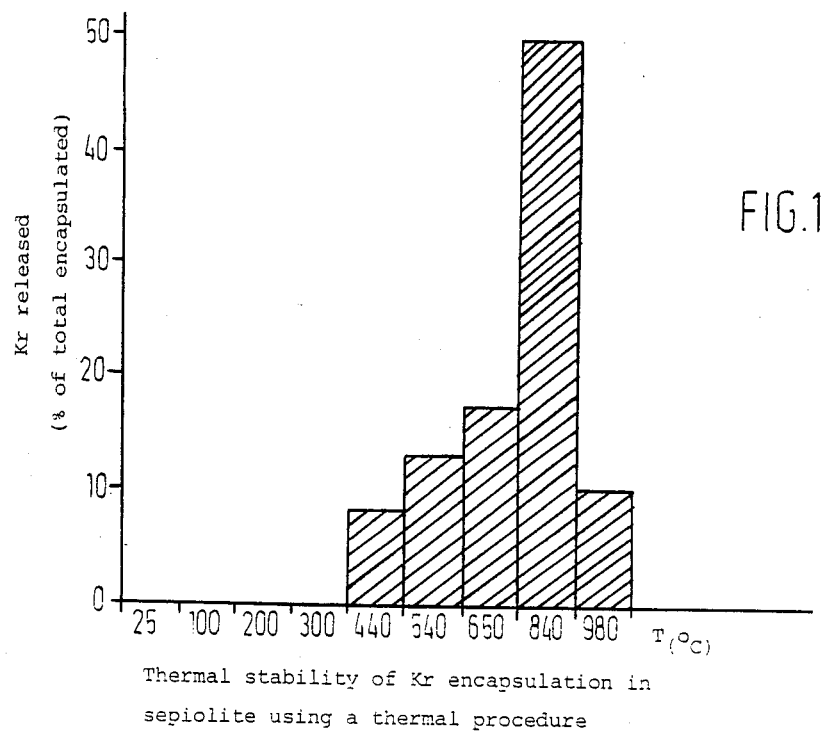

United States Patent [19]

Vansant et al.

[11] Patent Number: 4,569,683

[45] Date of Patent: Feb. 11, 1986

[54] METHOD OF ENCAPSULATING GASES, VAPORS, COMPLEXES AND IONS IN SOLIDS

[75] Inventors: Etienne Vansant, Zoersel; Paul De Bièvre, Kasterlee; Guido J. Peeters, Berchem; Anita Thijs, Heusden-Zolder; Ingrid Verhaert, Zichem, all of Belgium

[73] Assignee: European Atomic Energy Community (EURATOM), Luxembourg, Belgium

[21] Appl. No.: 662,354

[22] Filed: Oct. 18, 1984

[30] Foreign Application Priority Data

Oct. 21, 1983 [EP] European Pat. Off. ........ 83201517.6

[51] Int. Cl.$^4$ .............................................. B01D 53/04
[52] U.S. Cl. .......................................... 55/58; 55/66; 55/74
[58] Field of Search .................. 55/66, 74, 75, 58; 502/75, 80-84

[56] References Cited

U.S. PATENT DOCUMENTS

| | | | |
|---|---|---|---|
| 2,431,481 | 11/1947 | Hurd et al. ...................... | 502/80 X |
| 3,006,153 | 10/1961 | Cook ................................... | 55/75 X |
| 3,316,691 | 5/1967 | Sesny et al. ......................... | 55/66 |
| 3,962,129 | 6/1976 | Münzner et al. ................... | 55/75 X |
| 4,158,639 | 6/1979 | Berty ................................. | 55/66 X |
| 4,414,005 | 11/1983 | De Bièvre et al. ................. | 55/75 |
| 4,454,062 | 6/1984 | Penzhorn et al. .................. | 55/66 X |
| 4,461,631 | 7/1984 | Itabashi et al. .................... | 55/75 X |
| 4,466,812 | 8/1984 | Takaishi et al. ................... | 55/75 X |

FOREIGN PATENT DOCUMENTS

| | | |
|---|---|---|
| 29875 | 6/1981 | European Pat. Off. . |
| 49936 | 4/1982 | European Pat. Off. . |
| 1490331 | 11/1977 | United Kingdom . |

Primary Examiner—Robert Spitzer
Attorney, Agent, or Firm—Weingarten, Schurgin, Gagnebin & Hayes

[57] ABSTRACT

A clay material of the polygorskite group, pretreated or not, is degassed and contacted with a gas to be adsorbed and after adsorption the clay is heated while in contact with the gas so that the clay structure collapses, encapsulating the adsorbed gas. If desired the entrances of the pores may be narrowed to a desired size by adsorption of diborane before the adsorption of the gas.

6 Claims, 5 Drawing Figures

Thermal stability of Kr encapsulation in sepiolite using a thermal procedure

The influence of the nature of the gas molecules on the collapsing temperature

A : Ar (equilibrium pressure 0,198 bar)
B: $N_2$ (equilibrium pressure 0,198 bar)
C: $O_2$ (equilibrium pressure 0,099 bar)

The influence of pressure on the collapsing temperature.
Adsorption of Ar (equilibrium pressure 0,198 bar)
A: pretreated in vacuum
B: pretreated at 0,133 bar Ar pressure

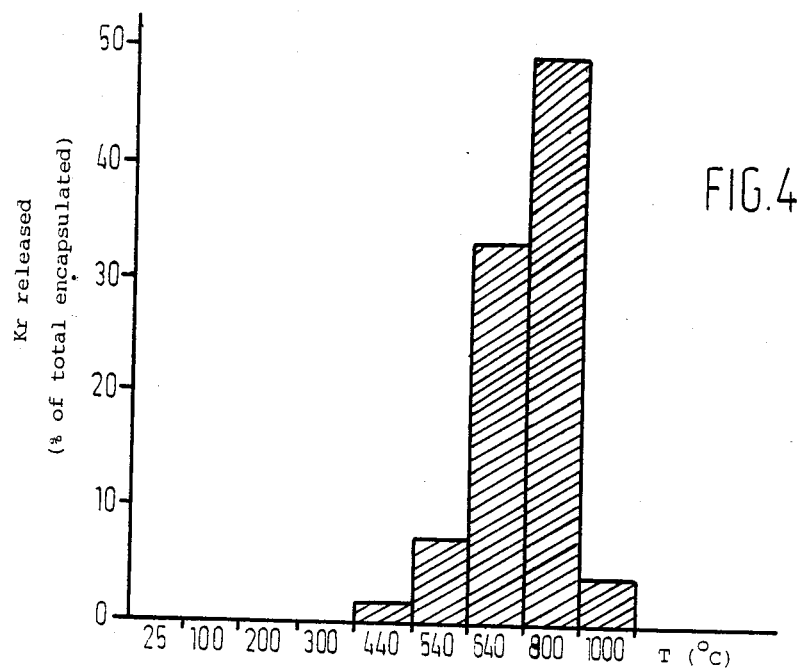
Thermal stability of Kr encapsulation in sepiolite using a combined thermal modification procedure
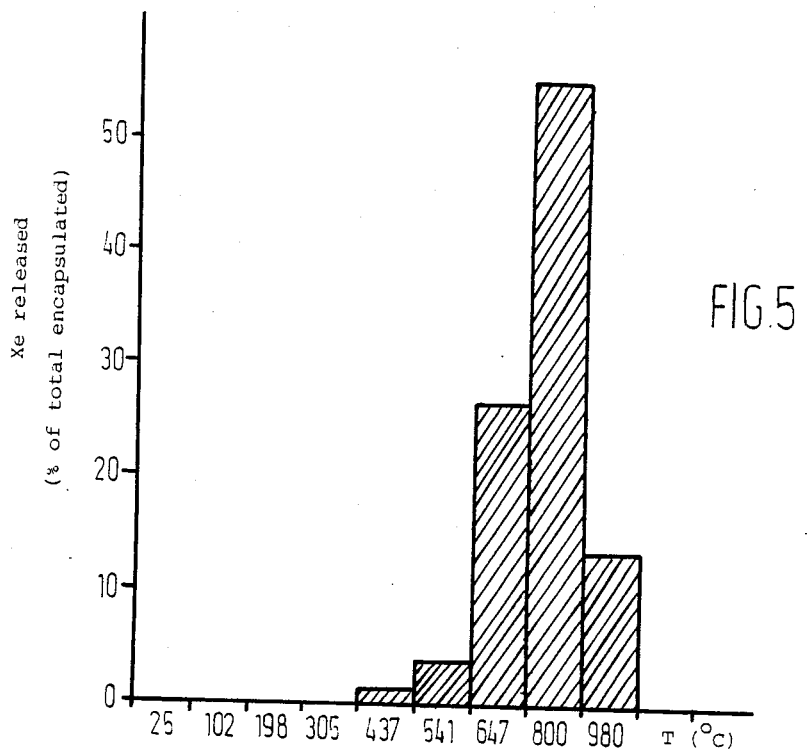
Thermal stability of Xe in sepiolite using a combined thermal/chemical modification procedure

METHOD OF ENCAPSULATING GASES, VAPORS, COMPLEXES AND IONS IN SOLIDS

This invention relates to a method of encapsulating compounds in fibrous or layer silicates. It is known that fibrous clays belonging to the polygorskite group, such as sepiolite, can adsorb gases or other materials and that they can also take in ions by ion exchange. Very important for the sorption properties of the material are the degassing conditions. When degassed at 1000° C. in vacuo, physically sorbed water is removed, but no structural change occurs and sorption of gas molecules between the hexagonal sheets is possible. At higher degassing temperatures a distortion of the lattice occurs, restricting the access to the channels in the structure, and resulting in a sharp decrease in the sorptive capacity. In the present patent application we claim the use of a structural change by a thermal or chemical modification for trapping adsorbed gas molecules.

A purely physical adsorption or ion exchange, is always a reversible process, so that an adsorbed gas is slowly or rapidly released spontaneously upon contact with atmospheric air, and ions can be liberated upon contact with aqueous solutions.

For the above reason such a simple adsorption or ion exchange is unsuitable for fixing undesirable materials definitively and in a stable manner, or for storing desirable substances in a simple and effective manner.

In U.S. Pat. No. 3,316,691, it is proposed to encapsulate gases or fluids in a suitable zeolite, whose pores are not large enough to take in the molecules concerned at room temperature and atmospheric pressure. In that process a gas or a liquid e.g. argon, krypton or methane, is adsorbed in the zeolite at a high pressure, e.g. 2000 bar. and a high temperature, e.g. 250°–350° C. After completion of the adsorption, the whole is cooled to room temperature and the pressure is released. It turns out that thereafter the adsorbed gas is only very slowly released again at room temperature. Desorption proceeds at a higher rate at a high temperature, for example at the temperature used during the adsorption.

According to the patent, this slow desorption is due to a potential barrier at the entrance of the pores. It is more probable, however, that the adsorbed molecules can only escape from the pores by diffusion, which always proceeds at a slow rate, and goes on continuously until all of the gas has been desorbed. Although it is proposed in the patent to use this method for storing adsorbed gases for a longer or shorter period of time, it is accordingly clear that this is only practicable, if the regular escape of a portion of such gases is not objectionable. Also the encapsulation requires much energy.

The European patent application No. 80103117.0 (Penzhorn) describes a method for encapsulating gas molecules under high pressures and high temperatures in zeolites. The encapsulation is based on a thermal vitrification of the zeolite in presence of pressurized gas. Under this pressure, and at higher temperature, the zeolite transforms into an amorphous stable material, containing the enclosed gas molecules. This process again requires high pressures and temperatures, and therefore much energy.

The European patent application No. 812.01137.7 describes the possibility to encapsulate gas molecules and other molecules by closing or narrowing the zeolitic pores after sorption under normal conditions of temperature and pressure. The pore size reduction is obtained by a structural modification process, based on chemisorption of a modifier such as $SiH_4$, etc. followed by further reaction with $O_2$, $H_2O$, $CH_3OH$, etc.

According to the present invention, gas molecules are trapped in fibrous or layer silicates, such as sepiolite or other (hereafter called "the material") between the hexagonal sheets of the structure, by distorting the lattice in the presence of gas molecules. This distortion can be obtained by thermal dehydration and/or reaction with modifying agents such as $B_2H_6$ or others.

By a pure thermal treatment, the sepiolite is first degassed at 100° C. under vacuum for removing physically adsorbed water. Then gas is allowed to the vessel, containing the material under a pressure between 1 and 20 bar. Subsequent heating of the material, which is still in contact with the gas, causes a further dehydration and a reorientation of the structure units resulting in encapsulation of the enclosed gas molecules. (The temperaure employed in this step is hereafter called "collapsing temperature"). The thermal treatment results in the loss of water, according to the following scheme:

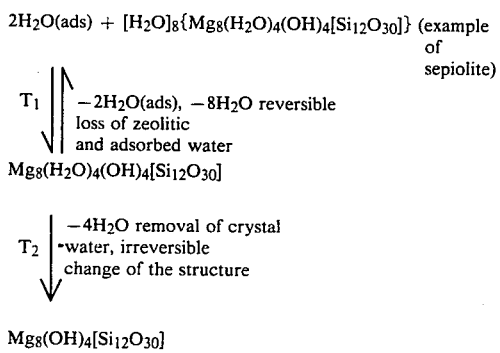

The values of $T_1$ and $T_2$ depend on the nature and the pressure of the surrounding gas. In air for example, $T_1$ and $T_2$ are 250° C. and 350°/450° C. respectively. In contrast with the high pressure/high temperature encapsulation, as reported by Penzhorn et. al., the structural collapse is not caused by a high pressure effect, but is the result of a dehydration, occuring at any pressure. Moreover when increasing the gas pressure, a higher temperature is required before a structural collapse occurs. Increasing the pressure therefore has a thermal disadvantage, but increases the loading capacity of the encapsulate. In addition, the encapsulation temperature (collapsing temperature) depends on the size of the gas molecules to be encapsulated: larger molecules require higher temperatures. The blocking of the desorption can be enhanced by treating the sample with $B_2H_6$. Because of its reactivity with water (hydration and structural), chains of —O—B—O— bonds are formed, resulting in an additional structural change of the mineral. The reaction with structural hydroxyl groups results in chemisorption of $BH_2$ groups:

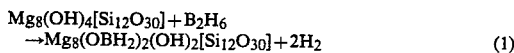

These groups react further with other OH groups:

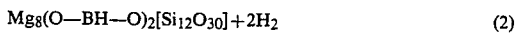

Further reaction with water can occur:

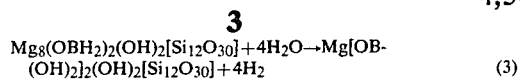

(3)

or

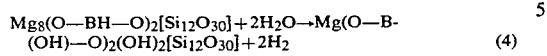

(4)

The reaction with water will occur with any type of water: crystal water, zeolitic water, adsorbed water. The manner in which diborane forms O—B—O bonds by hydrolysis depends on the pretreatment conditions before $B_2H_6$ is reacted with the substrate. Depending on the degree of hydration, different combinations of reactions 1–4 occur and different interconnecting O—B—O bonds are possible. As a result boranation of partly dehydrated samples and thermal dehydration leads to structural change with different properties. Using a combination of dehydration and boranation, encapsulation of gas molecules can be performed at lower treatment temperatures (collapsing temperature).

EXAMPLE I

Encapsulation of Kr in sepiolite by thermal treatment

A sample of sepiolite was activated at 110° C. under vacuum. Then the krypton was added to the sepiolite at 20° C. and 2 bar. The Kr-sepiolite system was heated to 450° C. After the thermal treatment the remaining gases were evacuated and the sample was kept under a static vacuum. The thermal stability of the Kr-sepiolite system was checked by gradually raising the temperature of the sample, collecting the released gases fractionally and analysing them by mass spectrometry.

The results are given below: (shown in FIG. 1)

| Temperature of sample °C. | Krypton released in % of total encapsulated |
|---|---|
| 440 | 8.25 |
| 540 | 13.2 |
| 650 | 17.57 |
| 840 | 49.65 |
| 980 | 9.9 |

The total amount of Krypton which had been encapsulated was 2 liters (STP) per Kg. of sepiolite.

EXAMPLE II (a) The influence of the nature of the gas molecules on the collapsing temperature A sample of sepiolite was heated stepwise from 20° C. to 350° C. under vacuum. During this heating no adsorbed gases were present. After each temperature interval the adsorption of gaseous Ar, $N_2$ and $O_2$ at $-196°$ C. was carried out to study the remaining adsorption capacity. Depending on the nature of the gas molecules different collapsing temperatures were observed (FIG. 2) at which this capacity sharply decreased (FIG. 2)

| Type of gas | collapsing temperature (°C.) |
|---|---|
| Ar | 150 |
| $N_2$ | 165 |
| $O_2$ | 190 |

Figure 2:
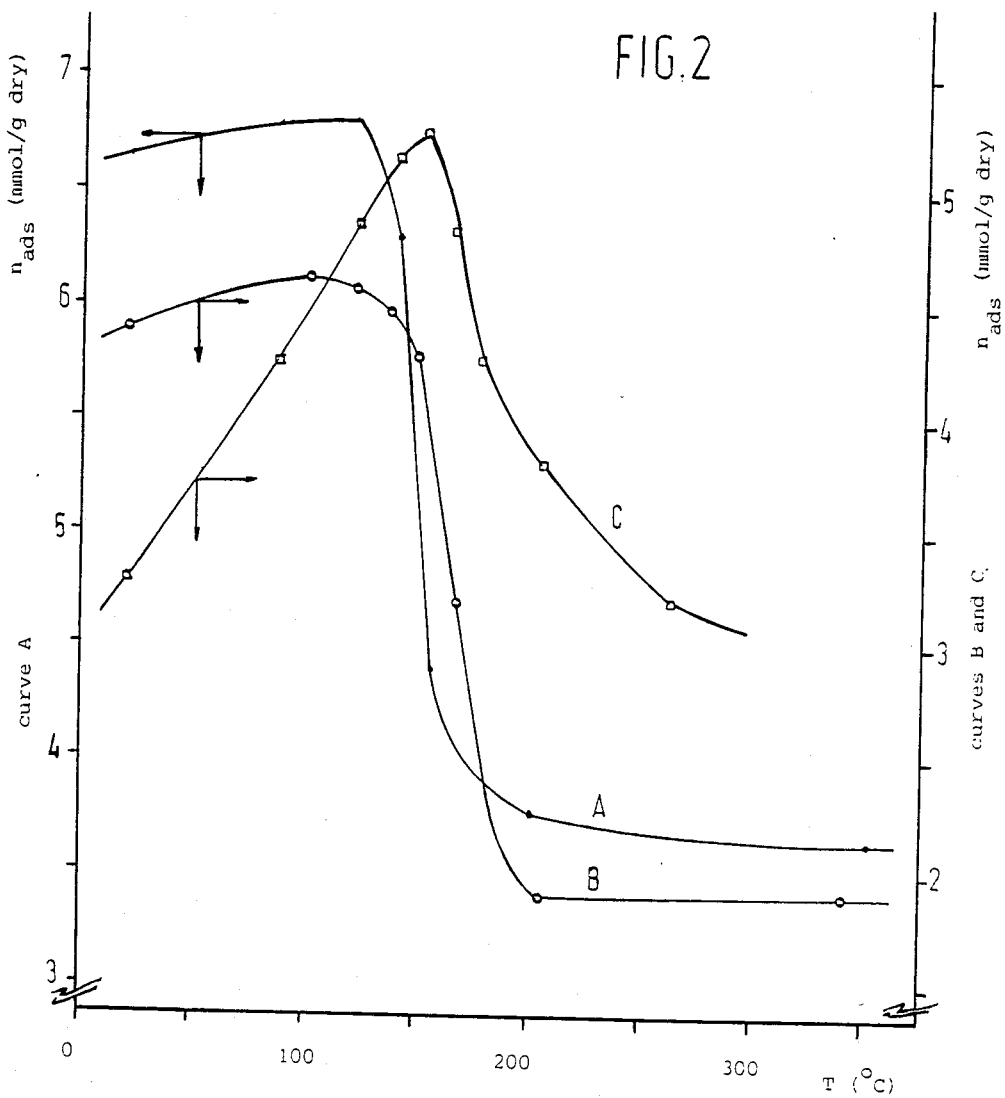

While these collapsing temperatures merely define the steepest point in the relative curves, the curves themselves, shown in FIG. 2 make it clear that a dramatic change occurs at about 150° C., whenever a sepiolite on which no gas has been adsorbed, is heated.

(b) The influence of the pressure on the collapsing temperature

In this experiment a sepiolite on which argon had been adsorbed was heated. The sample was heated under an argon pressure of 0,133 bar and the heating temperature was stepwise increased from 20° C. to 350° C.

After each heating the sample was cooled under argon pressure at room temperature, then the argon present was pumped off until a vacuum was obtained. At room temperature there is no danger of collapsing, either in the presence or in the absence of argon.

After this evacuation the adsorption capacity of the sample for argon was determined at $-196°$ in order to establish whether or not a collapse had taken place during the heating.

Figure 3:
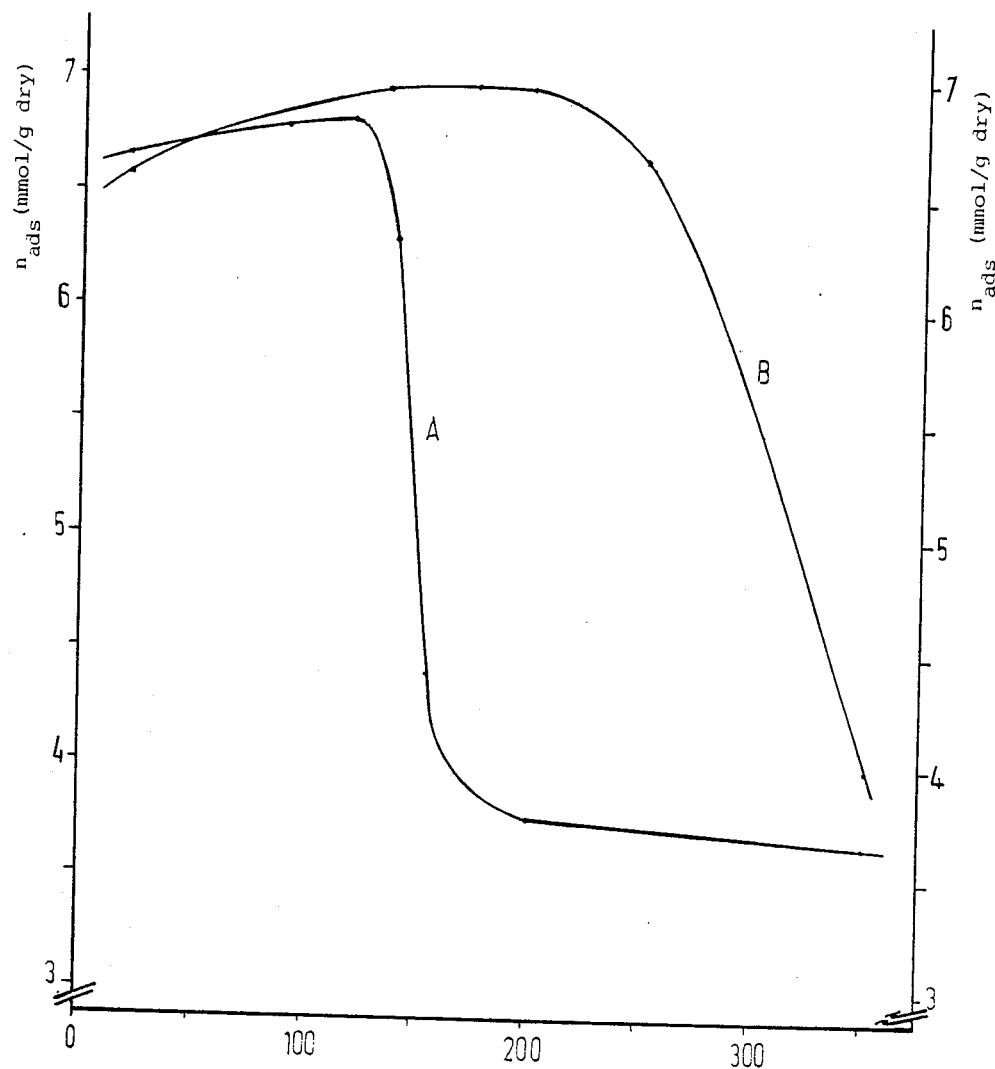

The results are shown in FIG. 3 (curve B). It turns out that the steepest decline in adsorption capacity occurs at about 350° C. as compared with 150° C. for the same sample when it was heated in a vacuum (curve A is shown in both FIG. 2 and FIG. 3). It would then seem that the adsorbed argon molecules support the structure of the sepiolite and delay the collapse.

EXAMPLE III

Encapsulation of Kr in sepiolite by a combined thermal—and chemical modification procedure A sepiolite sample was activated (dehydrated) by a thermal treatment at 110° C. in a vacuum. After a chemisorption of diborane at 20° C., kyrpton was added at 20° C. and 2 bar. The Kr-modified sepiolite system was heated to 450° C. to collapse the sepiolite. The stability of Kr-sepiolite system was then tested in a static vacuum at various temperatures by collecting all the released gases fractionally and analysing them by mass spectrometry.

The results are given below: (FIG. 4)

| Temperature of sample (°C.) | % Krypton released |
|---|---|
| 440 | 1.96 |
| 540 | 7.33 |
| 640 | 33.22 |
| 800 | 49.40 |
| 1000 | 4.26 |

The total encapsulated amount of Krypton was 10 liters (STP) per Kg. sepiolite.

EXAMPLE IV

Encapsulation of Xe in sepiolite by a combined thermal chemical modification procedure A sepiolite sample was activated by a thermal treatment at 110° C. in a vacuum. After a chemisorption of 0,80 mmol diborane per gram sepiolite at 20° C., Xe was added at 0° C. and 3 bar. The Xe-loaded sepiolite was heated to 480° C. The stability of the Xe-sepiolite system was then tested in a static vacuum at various tempertures by collecting all the released gas fractions and analysing them by pass spectrometry.

The results given below (FIG. 5).

| Temperature of sample (°C.) | Xe released (in % of total encapsulated) |
| --- | --- |
| 200 | — |
| 305 | 0.20 |
| 437 | 1.57 |
| 541 | 4.12 |
| 647 | 27.16 |
| 800 | 54.95 |
| 980 | 13.58 |

The total amount of encapsulated xenon was 15 liters (STP) per Kg. sepiolite.

We claim:

1. A method of encapsulating gas within a solid matrix comprising the following steps:

degassing and partially dehydrating a clay material of the polygorskite group;

introducing a gas to be encapsulated to the partially dehydrated polygorskite group material; and heating said partially dehydrated polygorskite group material at a temperature of at least 400° C. in the presence of said gas, causing the structure of said polygorskite group material to collapse, trapping said gas.

2. The method of claim 1 wherein the clay material of the polygorskite group is sepiolite.

3. The method of claim 1 wherein said degassing and dehydrating step is carried out under vacuum at a temperature of from about 100° C. to about 130° C.

4. The method of claim 3 wherein said degassing and dehydrating step is carried out at a temperature of from about 100° C. to about 110° C.

5. The method of claim 1 further comprising the step of treating said partially dehydrated polygorskite group material with diborane after said degassing and dehydrating step and before said introducing step.

6. The method of claim 1 wherein said heating step is carried out at a temperature of about 450° C.

* * * * *

UNITED STATES PATENT AND TRADEMARK OFFICE
CERTIFICATE OF CORRECTION

PATENT NO. : 4,569,683

DATED : February 11, 1986

INVENTOR(S) : Etienne Vansant; Paul De Bievre; Guido J. Peeters; Anita Thijs; Ingrid Verhaert It is certified that error appears in the above-identified patent and that said Letters Patent is hereby corrected as shown below:

Title page:

In the Assignee: "European Atomic Energy Community (EURATOM), Luxembourg, Belgium" should read --European Atomic Energy Community (EURATOM), Luxembourg, Luxembourg--

Column 4, line 13, "at room temperature" should read --to room temperature-- line 18, "-196° in" should read -- -196°C. in-- line 35, "kyrpton" should read --krypton-- line 67, "pass spectrometry." should read --mass spectrometry.--

Signed and Sealed this

Twenty-sixth Day of August 1986

[SEAL]

Attest:

DONALD J. QUIGG

Attesting Officer

Commissioner of Patents and Trademarks